Patented Feb. 6, 1940

2,189,058

UNITED STATES PATENT OFFICE 2,189,058

TREATMENT OF HYDROCARBON OILS

Roland B. Day, Amarillo, Tex., assignor to Universal Oil Products Company, Chicago, Ill., a corporation of Delaware No Drawing. Application April 14, 1937, Serial No. 136,789

6 Claims. (Cl. 196—36)

This invention relates particularly to the treatment of hydrocarbon oil distillates of approximate gasoline boiling range to render them stable and readily marketable.

The invention is more specifically directed to the treatment of cracked distillates since these are commonly more difficult to refine than the corresponding straight run distillates.

The problem of producing a stable and marketable gasoline from primary cracked distillates is one of long standing and the first attempts to solve it were made with sulfuric acid which had been a successful treating reagent on miscellaneous straight run distillates prior to the extensive use of the cracking process. The action of sulfuric acid on cracked distillates, however, is not entirely satisfactory when it is desired to remove considerable quantities of sulfur compounds present in some distillates since the acid not only acts upon these compounds and the more unsaturated olefinic hydrocarbons such as diolefins but also acts upon mono olefins which are thus lost as valuable antiknock constituents of the gasoline. Moreover, a sulfuric acid treatment requires a subsequent redistillation on account of the formation of various sulfuric acid reaction products such as organic esters, sulfones, high boiling polymers, etc., and the distillation step is an added expense. Various substitute treatments with other reagents than sulfuric acid have been tried and some have attained commercial importance such as, for example, the vapor phase treatment of cracked distillates with fuller's earth, clays, and other adsorbent materials either as such or impregnated with metals or heavy metal salts or oxides.

The present invention is concerned with a process whereby cracked distillates may be treated either in liquid, mixed or vapor phase with a solid granular reagent which produces results showing it to be a distinct improvement over previous types of processes employing either liquid or solid granular treating reagents.

In one specific embodiment the present invention comprises treatment of hydrocarbon oil distillates, particularly cracked hydrocarbon oil distillates, with solid granular contact materials comprising reaction products of zinc silicates and hydrochloric acid.

It has been found that the hydrochloric acid treatment of zinc silicates such as the mineral calamine having the general formula $Zn_2SiO_4$ may be made under properly controlled conditions to produce a porous contact material which is markedly effective in selectively removing the more highly unsaturated gum-forming constituents of cracked distillates. The reactions involve the formation of zinc chloride in the skeletons of silicic acids so that in effect hydrocarbon oil treatments are accomplished both by the chemical action of zinc chloride and the adsorptive action of the silicic acid. By observing the proper method of preparation of this type of treating reagent which will be described in following paragraphs, materials of high treating efficiency and strong structure are produced, which are substantially dry and free from hydrochloric acid so that they can be safely used in metal equipment with practically no danger of corrosion if protected as far as practically possible from moisture contacts.

The following instance of preparation of a treating composite in accordance with the present invention is given to illustrate the general method although it is to be understood that with other types of zinc silicates either natural or synthetic, the procedure both as to relative quantities of reagents and temperatures of treatment may be varied considerably without departing from the scope of the invention.

The mineral calamine was ground until substantially all the particles passed a 60 mesh screen. 700 parts by weight of the powdered material was then mixed with 835 parts by weight of commercial muriatic acid of approximately 38% strength until the reaction was complete. The mixing was done at ordinary temperature and considerable heat was evolved although not in amount to render the reaction uncontrollable, particularly if the mixing was done gradually. After the reaction mixture had cooled to room temperature it set to a more or less jelly-like consistency and this material was dried at a temperature of approximately 175° F. until it had hardened considerably after which it was again crushed and mixed with an equal part by weight of dry zinc oxide. An amount of water equal to one-half the weight of the mix was then added while stirring vigorously by mechanical means until the material began to show evidences of setting. It was found to be important at this point to stop the stirring just short of the point of setting to preserve the structural strength of the material.

The coarsely broken material was then heated at a temperature of 220–230° F. for 18 hours and was then ground and sized to produce particles of from approximately 16–30 mesh in diameter which constituted the desired treating reagent. The fines could be added to a second batch of calamine for treatment so that ultimately no material was lost. The particles were hygroscopic and were protected from air contacts as much as possible prior to use. It is probable that the main compound of zinc in the composite reagent was the oxychloride having the formula ZnOHCl.

The above procedure may be modified in some particulars. For example, the dried initially formed gelatinous material may be mixed with an aqueous slurry of 1 part zinc oxide suspended in an equal weight of water or if desired the gel may be crushed and made into a slurry with water and mixed with a similar suspension of a zinc oxide. As already observed, the proportioning of the materials will depend upon the original composition and characteristics of the zinc silicate employed as starting material.

The composite particles produced by the above described general process may be employed in a number of ways to effect the treatment of hydrocarbon distillates to remove potential gum-forming compounds, to some extent reduce the sulfur content, and improve the color and odor. Treatments may be made, for example, by merely stirring the prepared composites with a liquid distillate either at ordinary or slightly elevated temperatures under reflux conditions. In other instances the liquid materials may be pumped through stationary beds of the material contained in cylindrical filter chambers in much the same manner that liquid phase adsorbent earth treatments are conducted. Where more severe treating is necessary considerably elevated temperatures of the order of 400–600° F. and superatmospheric pressures as high as 400 lbs. per square inch may be employed while the material is being pumped or vaporized through the beds of prepared reagents. A particular application of the process consists in passing the vapors directly from a cracking plant through chambers containing stationary masses of the granular particles in a manner generally similar to that employed when using clays or fuller's earth. Such points as temperature, pressure, phase, and time of contact will depend upon the characteristics of the distillate treated and the extent of treating desired. In general it has been found that treating reagents of the present character have a considerably greater selective action than similar reagents heretofore employed and that they are more effective in reducing sulfur for the same degree of removal of gum and color-forming hydrocarbons.

The following example is introduced to show the results obtainable in commercial practice by the process of the present invention. The gasoline whose properties are shown in the first column of the table was preheated and vaporized under pressure and the vapors passed through stationary beds of (1) fuller's earth and (2) a treating material prepared in accordance with the scheme outlined above. For purposes of comparison the results for different throughputs are given for each type of treating reagent. The charging stock was a cracked distillate produced by the intensive pyrolysis of a mixture of Mid-Continent residua.

the treatment according to the present process yielded results considerably better than the fuller's earth treatment. This is evident in the higher color after treatment for a given yield, the higher color stability, the lower copper dish gum and the higher susceptibility to reduction in gum content and increase in induction period after the addition of a small percentage of a commercial inhibitor. Furthermore the mercaptan sulfur in the product from the process treatment was substantially zero.

The nature of the invention and its practical aspects can be seen from the foregoing specification and limited numerical data though the scope of the invention is not intended to be limited unduly by either section.

I claim as my invention:

1. A process for refining hydrocarbon oils which comprises contacting the oil in the absence of hydrochloric acid with a dry, pre-formed solid reaction product of a zinc silicate and hydrochloric acid, said product being substantially devoid of free hydrochloric acid.

2. A process for refining hydrocarbon oils which comprises contacting the oil in the absence of hydrochloric acid with a pre-formed zinc silicate and hydrochloric acid reaction product to which zinc oxide has been added, said product being a dry solid substantially devoid of free hydrochloric acid.

3. A process for refining cracked gasoline distillate which comprises treating the distillate in the absence of hydrochloric acid with a dry, pre-formed solid reaction product of a zinc silicate and hydrochloric acid, said product being substantially devoid of free hydrochloric acid.

4. A process for refining cracked gasoline distillate which comprises treating the distillate in the absence of hydrochloric acid with a pre-formed zinc silicate and hydrochloric acid reaction product to which zinc oxide has been added, said product being a dry solid substantially devoid of free hydrochloric acid.

5. A process for improving cracked hydrocarbon vapors which comprises contacting the vapors in the absence of hydrochloric acid with a dry, pre-formed solid reaction product of a zinc silicate and hydrochloric acid, said product being substantially devoid of free hydrochloric acid.

6. A process for improving cracked hydrocarbon vapors which comprises contacting the vapors in the absence of hydrochloric acid with a pre-formed zinc silicate and hydrochloric acid reaction product to which zinc oxide has been added, said product being a dry solid substantially devoid of free hydrochloric acid.

|  | Charging stock | Treated with fuller's earth | | Treated with process reagent | |
|---|---|---|---|---|---|
| Pressure_____pounds__ | _____ | 250 | 250 | 250 | 250 |
| Temperature_____°F__ | _____ | 400 | 400 | 400 | 400 |
| Bbls./ton yield_____ | _____ | 300–512 | 512–738 | 300–516 | 516–745 |
| Color, Saybolt_____ | Yellow | 23 | 21 | 25 | 23 |
| Color stability *_____ | _____ | 18 | 16 | 22 | 21 |
| Copper dish gum, gr./100 cc__ | 416 | 76 | 125 | 48 | 89 |
| Copper dish gum, +0.025% commercial inhibitor_____ | 343 | 7 | 7 | 1 | 3 |
| Induction period____minutes__ | 170 | 210 | 200 | 195 | 195 |
| Induction period +0.025 commercial inhibitor_____ | 225 | 415 | 385 | 615 | 530 |
| Doctor test_____ | Positive | Negative | Negative | Negative | Negative |
| Mercaptan sulfur, percent____ | 0.040 | 0.021 | 0.023 | 0 | 0 |
| Total loss_____ | _____ | 2.5 | 2.5 | 3.0 | 3.0 |
| Polymerization loss_____ | _____ | 1.0 | 1.0 | 3.0 | 2.5 |

* Loss after 4 hours exposure to sunlight.

It will be observed from the above data that

ROLAND B. DAY.